United States Patent
Alticosalian (10) Patent No.: US 6,390,323 B1
(45) Date of Patent: May 21, 2002

(54) CONTAINER

(76) Inventor: Gerald Hagop Alticosalian, 27 Beaufort Road, Ealing, London, W8 3EB (GB)

( * ) Notice: Subject to any disclaimer, the term of this patent is extended or adjusted under 35 U.S.C. 154(b) by 0 days.

(21) Appl. No.: 09/691,823

(22) Filed: Oct. 19, 2000

Related U.S. Application Data (63) Continuation of application No. PCT/GB00/00551, filed on Dec. 17, 2000.

(51) Int. Cl.$^7$ .......................... B65D 25/14; B65D 35/14; B65D 90/00
(52) U.S. Cl. ..................... 220/495.03; 220/495.07; 220/495.09; 220/495.11
(58) Field of Search ................ 220/495.07, 495.03, 220/495.08, 495.09, 495.1, 495.11

(56) References Cited

U.S. PATENT DOCUMENTS

| | | | | |
|---|---|---|---|---|
| 730,082 A | * | 6/1903 | Bates | 220/495.07 |
| 1,574,259 A | * | 2/1926 | Sarff | 206/495.07 |
| 3,076,579 A | * | 2/1963 | Kuhlman | 206/495.07 |
| 3,128,904 A | * | 4/1964 | Reilly | 206/495.07 |
| 4,800,845 A | | 1/1989 | Budd | 119/61 |
| 5,046,633 A | | 9/1991 | Chung | 220/407 |
| 5,363,980 A | * | 11/1994 | Mulcahy | 220/495.07 |
| 5,445,110 A | | 8/1995 | Birnie | 119/61 |

FOREIGN PATENT DOCUMENTS

GB 2 229 699 A 10/1990

\* cited by examiner

*Primary Examiner*—Joseph M. Moy
(74) *Attorney, Agent, or Firm*—St. Onge Steward Johnston & Reens, LLC (57) ABSTRACT

According to a first aspect of the present invention there is provided a container having one or more side walls, including means for releasably retaining covering means comprising a flexible covering material, characterized in that said retaining means is formed on or by said side wall or walls and in the lower region of the interior of the container, such that said covering means covers the interior and at least partially covers the outer surface of said side wall or walls.

12 Claims, 8 Drawing Sheets

CONTAINER

This application is a con of PCT/GB00/00551 filed Feb. 17, 2000.

This invention relates to a container and in particular, though not exclusively, to the type of open-topped container or vessel used, for example, as a potty or a pet food bowl.

Potties are generally made from inexpensive plastics material and need to be hygienically cleaned after use. This involves cleaning and sterilising the potty with detergents. Detergents cause irritation and can be potentially harmful if they come into contact with the person who cleans or uses the potty.

As a way of overcoming this problem it is known for potties to have disposable liners. For example, GB-A-2248180 discloses a disposable liner for fitting inside a potty, the liner being releasably attached to the potty by adhesive tabs. EP-A-0371622 discloses a disposable liner of a liquid absorbent material for fitting in a potty, the liner being able to be self-sealed after use. However, these liners are not secured very well to the potty and a toddler could easily remove the liner when using the potty.

Pet food bowls are also generally made from inexpensive plastics material and it is usual practise to leave pet food in them for some time for the cat or dog to eat at leisure. However, this practise causes the pet food to go dry and stick to the bowl, which is then difficult and messy to clean, and vigorous cleaning of the bowl can soon lead to corrosion of the surface of the plastics material thereby making cleaning even more difficult.

As a way of overcoming this problem it is known for bowls to have disposable liners. For example, GB-A-2152794 discloses an animal feeding bowl which holds a disposable thin film liner. The liner is of a plastics material in a shape that allows a plurality of liners to stack, nesting in one another. However, such a liner is not securely held to the bowl and an animal may be able to knock the liner out of the bowl when feeding. GB-A-2304273 discloses an animal feeding bowl in which an inner liner of plastics material or paper is secured to the bowl by complementary locating means before each feed and the liner being removed and disposed of after each feed. However, an animal eating out of the bowl is liable to pull the central portion of the liner out of the bowl which may cause the liner to tear.

In addition, in the discussed prior art it is necessary for a person to have to attach a new liner to a potty or bowl every time a used liner has been disposed of.

It is an object of the present invention to provide an inexpensive container which is suitable for use as, for example, a potty or pet food bowl.

According to a first aspect of the present invention there is provided a container having one or more side walls, including means for releasably retaining covering means comprising a flexible covering material, characterized in that said retaining means is formed on or by said side wall or walls and in the lower region of the interior of the container, such that said covering means covers the interior and at least partially covers the outer surface of said side wall or walls.

The means for releasably retaining the covering means may include an aperture in the upper face of the container for anchoring a part of the covering means in the lower region of the upper face. The retaining means formed in the lower region of the upper face preferably comprise a plurality of slots extending substantially radially from the aperture so as to provide a plurality of downwardly-pointing, resilient fingers which inhibit upward pulling of the covering means which is retained by the aperture, the aperture being centrally located.

The means for releasably retaining the covering means may include a plurality of engaging members on the side wall or walls of the container, each engaging member being adapted to engage a recess or hole in the covering means.

The container preferably includes a flexible sheet-like protective member which covers at least the lower region of the interior for protecting the covering means from being damaged by the retaining means formed in the lower region of the interior. The protective member is preferably retained by the retaining means. The protective member may have a plurality of holes for the engaging members to engage.

The interior of the container may comprise a generally cone-shaped upper face supported by the one or more side walls. The upper face is preferably shaped so as to form a substantially flattened V-shape in vertical cross-section.

The container may comprise a kit of parts including at least one side wall unit and said upper face which fit together. The or each side wall unit may comprise a plurality of interconnecting wall segments. Each wall segment may be hinged to at least one adjoining wall segment so as to make the wall unit flexible. At least some of said wall segments may include retaining means for holding the upper face in place when the container is constructed from the kit of parts. The wall unit or units may be conveniently stored in a substantially flattened shape and then assembled for use of the container.

The container may include a removable ring which is adapted to be placed over the container so as to aid in retaining the covering means on the container.

According to a second aspect of the invention, there is provided covering means suitable for use with a container constructed in accordance with the first aspect of the present invention, comprising a plurality of disposable, flexible, sheet-like covering members arranged relative to each other such that, when said covering means is in use with said container, the interior of said container remains covered by said covering means and said side wall or walls remain at least partially covered by said covering means upon sequential removal therefrom of said covering members until all of said covering members have been removed.

It may be desirable for the sheet-like covering members of the covering means to be stacked. Each sheet-like covering member may have a plurality of holes for the engaging members to engage.

In a preferred embodiment, the covering means comprises a plurality of disc-shaped covering members arranged in a stack and having a plurality of holes therein spaced around the periphery of said stack, such that the stack can be placed over said upper face and be retained thereon by said retaining means with the container having said sheet-like protective member covering at least the lower region of the upper face beneath said stack.

The present invention thus describes an inexpensive container having retaining means for securely holding covering means preventing the covering means from being pulled out of the container and/or being damaged when the container is in use, the covering means being able to be easily removed from the container after use. In the preferred embodiment, the container is arranged to hold a stack of disc-shaped covering members whereby a person does not have to attach a new covering member to the container every time a used covering member is disposed of.

Embodiments of the present invention will now be described, by way of example, with reference to the accompanying drawings, in which.

Figure 1:
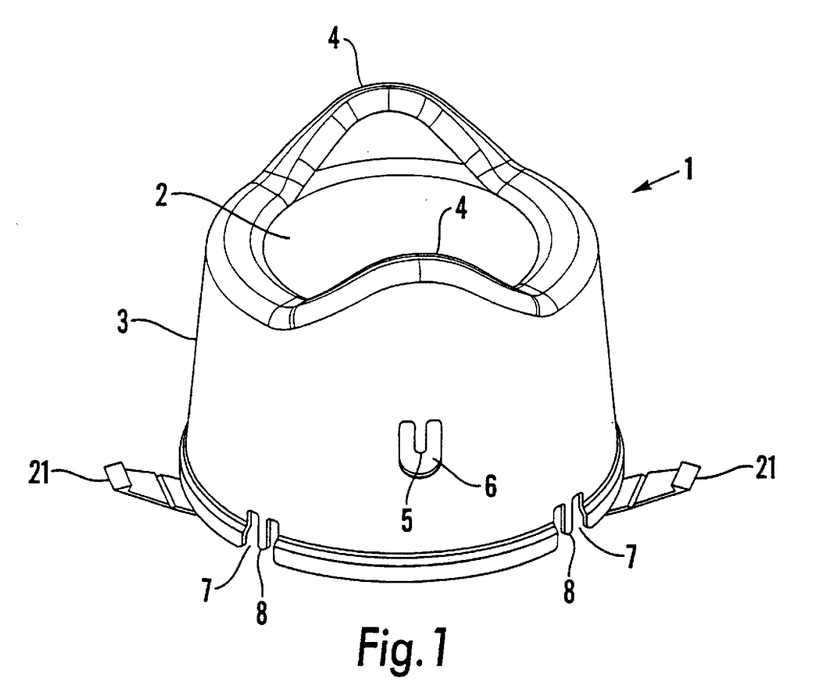
FIGS. 1 and 2 are perspective views of a container suitable for use as a potty in accordance with a first embodiment of the invention.
Figure 2:
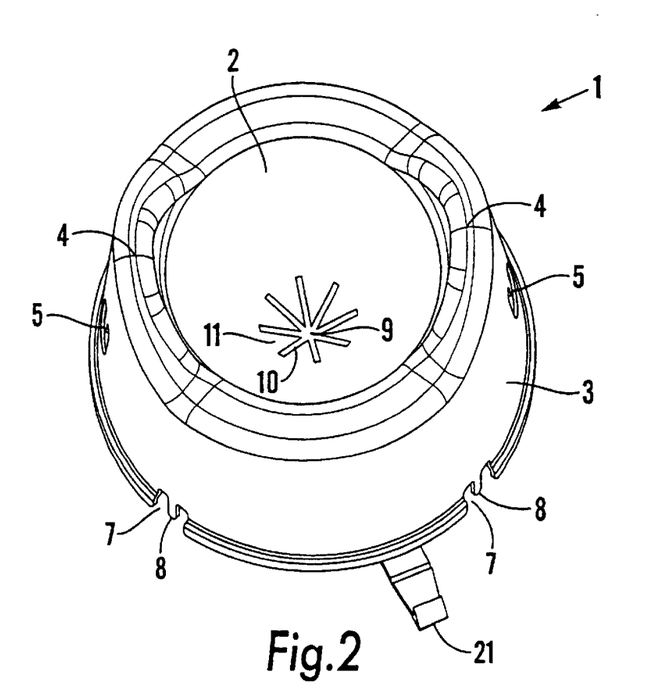

Referring to FIGS. 1 and 2 of the accompanying drawings, a container 1 suitable for use as a potty, comprises a cone- or funnel-shaped upper face 2 and an annular side wall 3 supporting the upper face, the side wall being frusto-conical, its base having the larger diameter. On the upper periphery of the potty there is a pair of diametrically opposed raised parts 4. Below each raised part there is an engaging member in the form of a downwardly pointing tongue 5 formed in the side wall and surrounded by a U-shaped aperture 6. At the base of the side wall there are a plurality of spaced engaging members in the form of downwardly pointing tongues 8, each tongue being contained in a recess 7 in the base of the side wall.

The lower region of the upper face 2 is formed with a central aperture 9 from which a plurality of slots 10 extend radially, thereby forming a plurality of downwardly-pointing, resilient, flexible fingers 11 around the aperture, forming a means for retaining flexible covering material.

Figure 3:
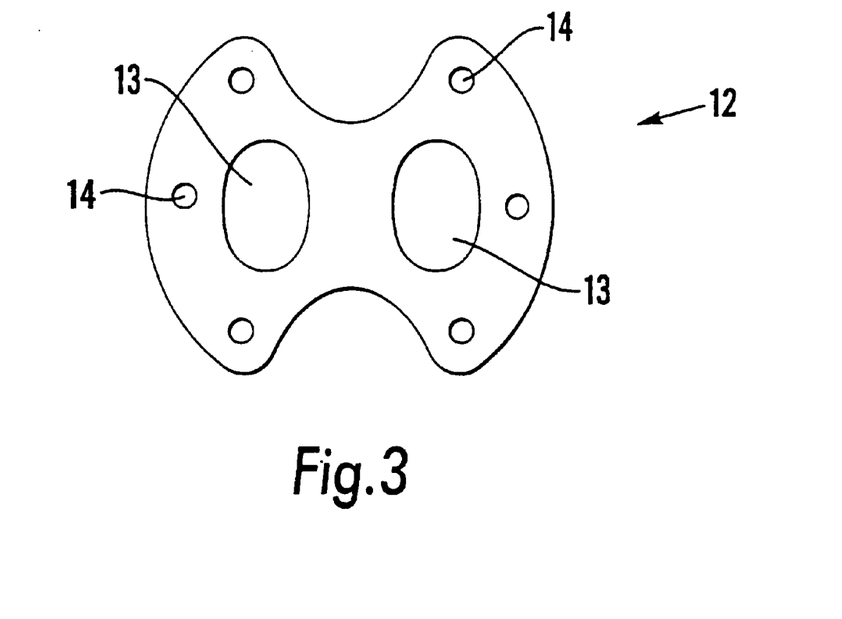
FIG. 3 is a plan view of a protective sheet for the potty.

Referring to FIG. 3, a flexible protective sheet 12 for covering the lower region of the upper face 2, is shown. The protective sheet has a pair of apertures 13 for receiving the raised parts 4 of the potty 1. Close to the perimeter of the sheet are a plurality of spaced apart holes 14 for engaging the tongues 5,8 of the potty.

Figure 4:
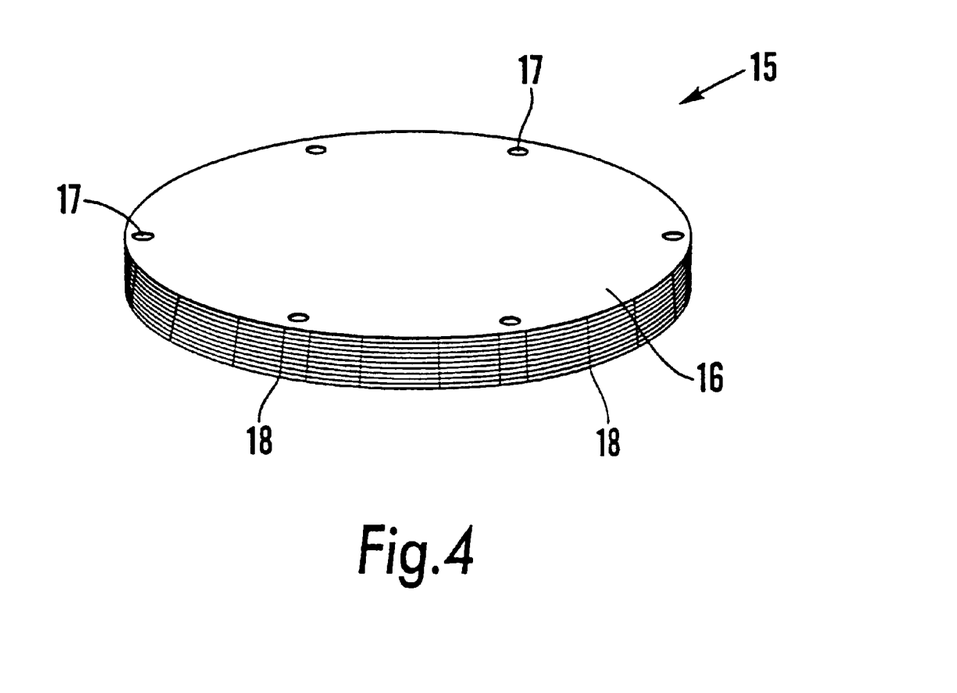
FIG. 4 is a perspective view of a stack of covering sheets.

Referring to FIG. 4, a stack 15 of circular sheets 16, forming the flexible covering material, is shown. The stack has a series of spaced holes 17 close to its circumference with the holes passing through all the covering sheets 16 in the stack. In this embodiment, there are six holes. The covering sheets 16 are preferably a high density polyethylene plastics film which is inexpensive and easy to use. The individual covering sheets of the stack are preferably thinner than the protective sheet. Each covering sheet 16 is preferably approximately twelve microns thick and has an anti-bacteria additive. A stack may typically contain forty covering sheets. The covering sheets of the stack are held together by the side of the stack being melted at spaced intervals 18 on its periphery by heating elements.

Figure 5:
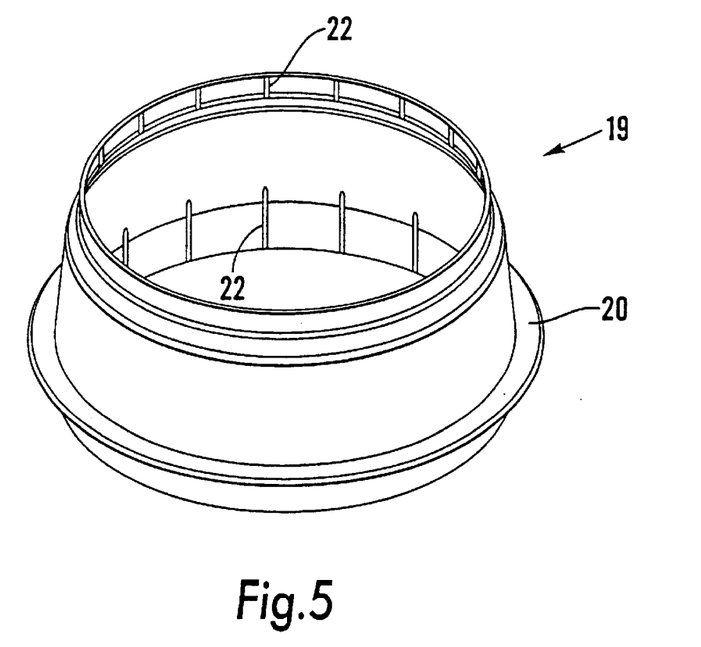
FIG. 5 is a perspective view of a ring for the potty.
Figure 6:
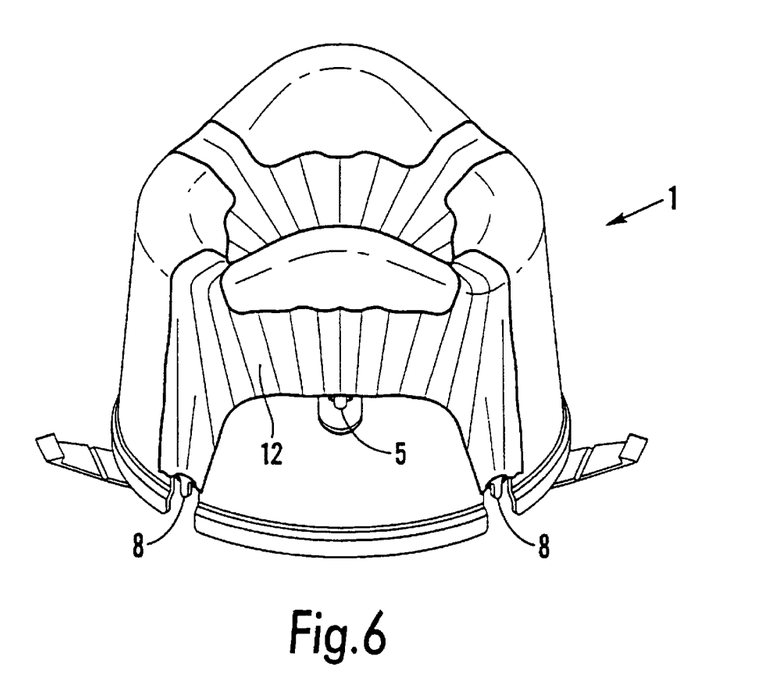
FIG. 6 is a perspective view of the potty with the protective sheet on it.
Figure 7:
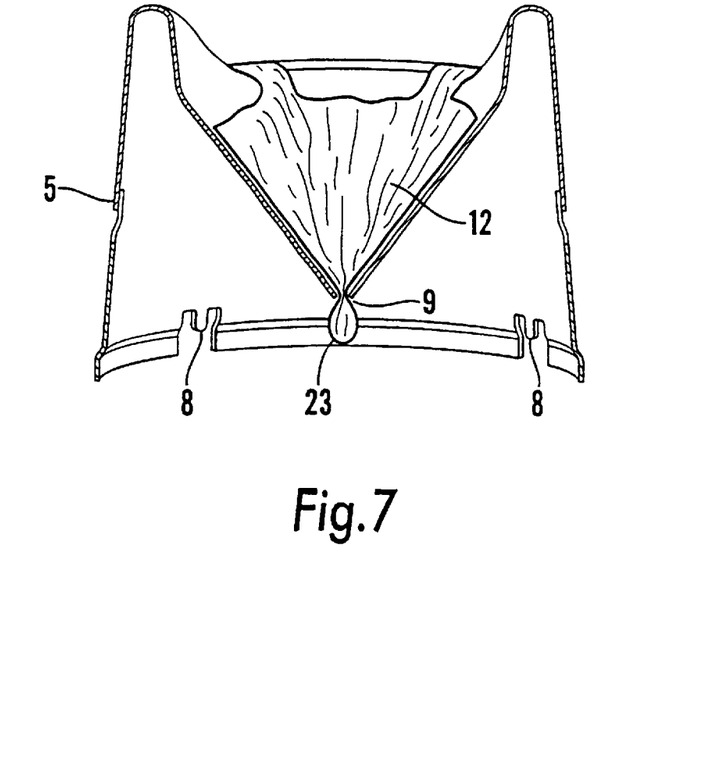
FIG. 7 is a cross-sectional view of FIG. 6.
Figure 8:
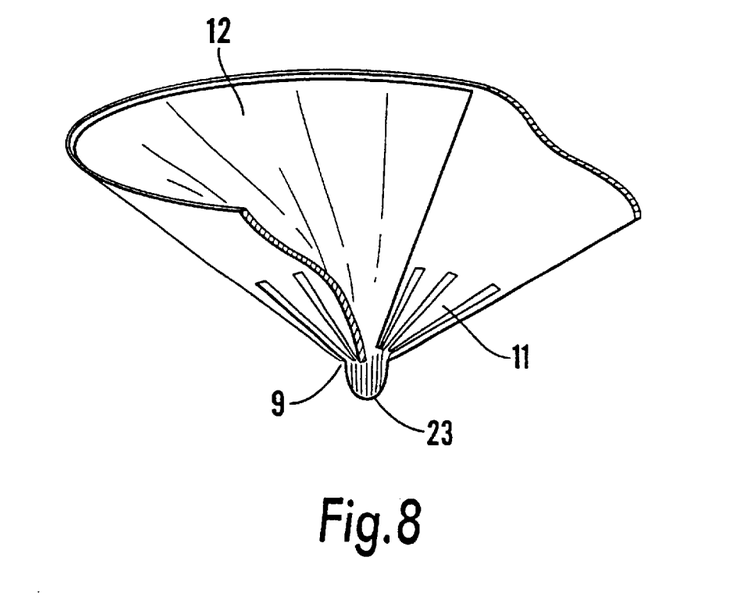
FIG. 8 is a schematic perspective view of part of the upper face of the potty with the protective sheet partially cut away.
Figure 9:
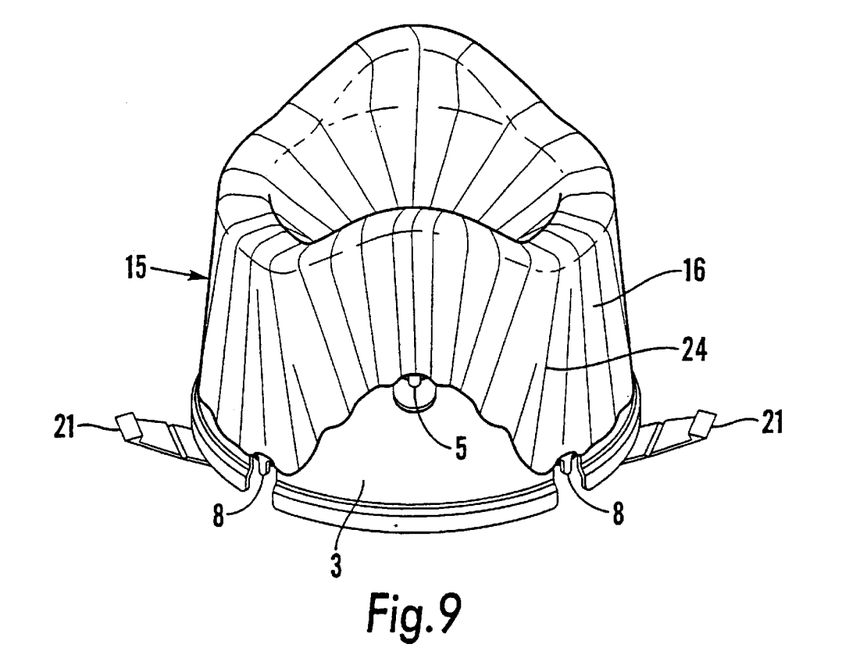
FIG. 9 is similar to FIG. 6 and, in addition, includes the stack of covering sheets on the potty.
Figure 10:
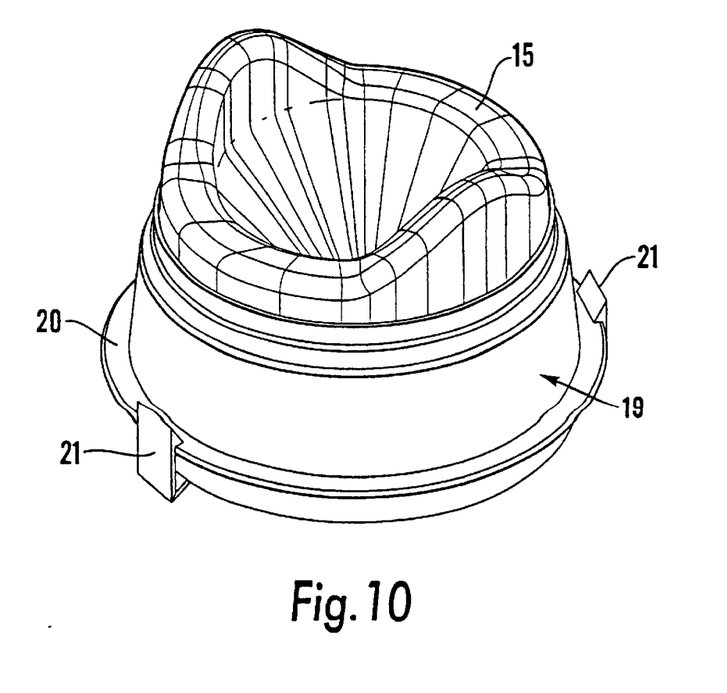
FIG. 10 is similar to FIG. 9 and, in addition, includes the ring on the potty.

Referring to FIG. 5, a ring 19 comprising an annular wall for substantially covering the side of the potty 1, is shown. The ring is frusto-conical to suit the shape of the potty. The outside surface of the ring has a flange 20 for aiding its fitting over, and removal from, the potty and is adapted to be held by a plurality of spaced apart flexible hinged clips 21 at the base of the side wall 3 of the potty 1 (see FIGS. 1 and 2). On the inside surface of the top and bottom portions of the ring are a plurality of spaced apart ribs 22 extending from and perpendicular to the respective openings at either end of the frusto-cone.

Referring to FIGS. 6 to 10, the protective sheet 12 is placed on the potty 1 with the apertures 13 receiving the raised parts 4 and each hole 14 being placed over a respective tongue 5,8 to hold the protective sheet to the potty. The centre of the protective sheet 12 is then pushed down by, for example, a suitable tool so that a central portion 23 of the protective sheet passes through the aperture 9 (FIGS. 7 and 8), the sheet creasing between the fingers. The tongues 5,8 and the downwardly-pointing resilient fingers 11 inhibit upward pulling of the central portion of the protective sheet back through the aperture, so that the protective sheet is held as taut as possible over the lower region of the upper face. The protective sheet 12 is left permanently on the potty 1.

In use, the stack 15 of covering sheets 16 is placed above the protective sheet (FIG. 9), the holes 17 in the covering sheets 16 being placed over the tongues 5,8 and the centre of the stack is pushed down by, for example, a suitable tool so that a central portion of the stack passes through the aperture in the same way as that described for the protective sheet 12. This cause pleats 24 to be formed in the stack. The tongues 5,8 and the downwardly-pointing resilient fingers 11 form retaining means and inhibit upward pulling of the central portion of the stack back through the aperture 9, so that the stack 15 is held as taut as possible above the protective sheet 12 and the upper face 2. Thus, the upper face 2 and the side wall 3 above the tongues 5,8 are completely covered by the stack 15.

The ring 19 is then placed over the potty 1 and the attached stack 15 so as to flatten and substantially cover the part of the stack covering the side wall 3 below the upper periphery of the potty. The flange 20 may be used to push the ring down and the clips 21 are then snapped shut in a conventional manner (FIG. 10) to engage the flange 20 and retain the ring 19.

When the potty 1 has been used the uppermost covering sheet is quickly and easily removed from the potty by pulling it off to expose a fresh covering sheet (or the protective sheet if it is the last remaining sheet of the stack), the central aperture 9 retaining the remaining covering sheets of the stack 15. This can be done, for example, by pinching the uppermost sheet above the raised parts 4. The holes 17 of the covering sheet 16 are sufficiently close to its circumference and the material of the covering sheets sufficiently weak for the covering sheet to tear from the circumference of the holes when that sheet is pulled off. It can thus be seen that the ring does not need to be removed every time a covering sheet needs to be removed. The aperture 9 is sufficiently small and the fingers 11 sufficiently resilient to hold the central portion of the last remaining sheet of the stack. The protective sheet 12 is provided to prevent the covering sheets 16 of the stack from being torn by the fingers 11 when a covering sheet is removed.

When a covering sheet is removed, the periphery of that sheet is gathered so that a knot can be tied in the covering sheet close to the gathered periphery sealing the contents of the covering sheet. The tied covering sheet enclosing the contents can then be easily disposed of with the minimum of fuss.

When a stack 15 is finished a new stack can be installed on the potty 1 above the protective sheet 12.

It can be seen that the present invention provides a container suitable for use as a potty 1 which can be kept clean by a disposable sheet.

In a second embodiment illustrated in FIGS. 11 to 15, a container 30 suitable for use as a pet food bowl, comprises a generally cone- or funnel-shaped upper face 31, the periphery of which is octagonal, and a side wall unit 32 comprising eight wall segments 33, there being a wall segment corresponding to each side of the periphery of the upper face. The wall segments 33 are trapezoidal in shape with the bottom of each segment being slightly longer than their top. Each wall segment is hinged on two opposite sides to adjoining wall segments. On both the inside face and the outside face of the side wall unit 32 a groove 34 is formed by the sides of adjoining wall segments. On the inside face and close to the top of each wall segment 33 is a recess 35 (see FIG. 13) for receiving a part of the upper face 31. At the base of each wall segment 33 are a plurality of spaced recesses 36, each recess 36 containing a tongue 37 which is coincident with the segment 33.

Figure 11:
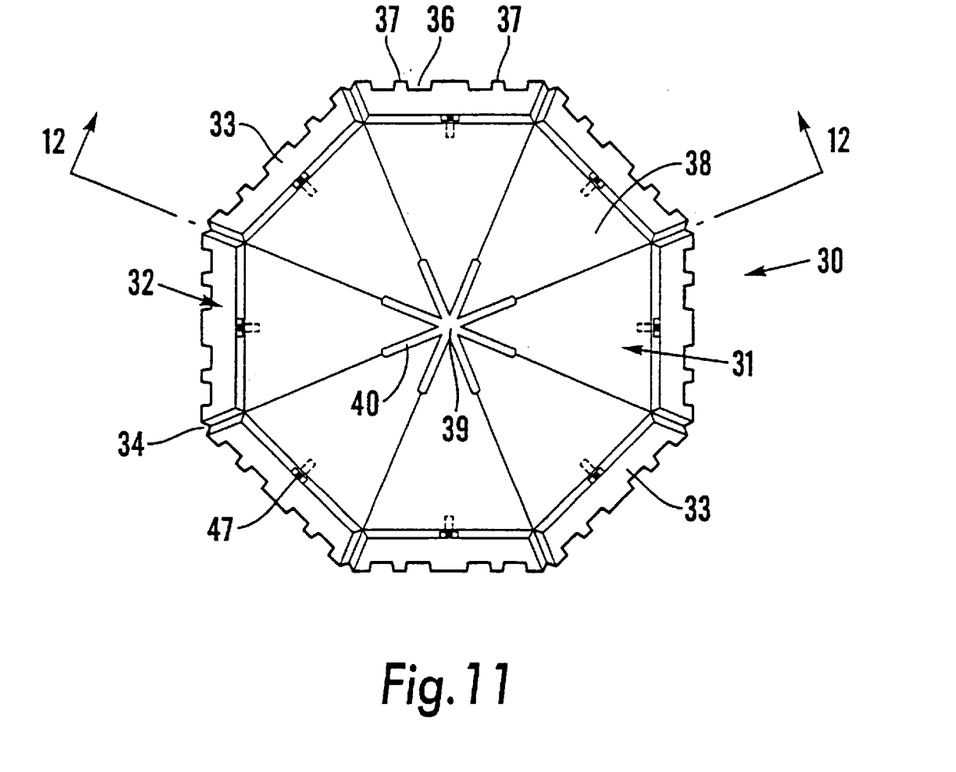
FIG. 11 is a plan view of a container suitable for use as a pet food bowl in accordance with a second embodiment of the invention.
Figure 12:
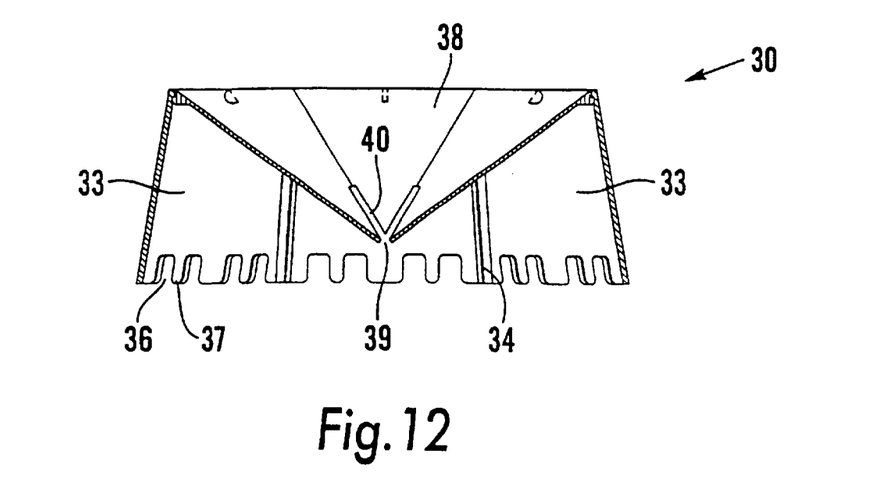
FIG. 12 is a sectional view taken along lines 12—12 of FIG. 11.
Figure 13:
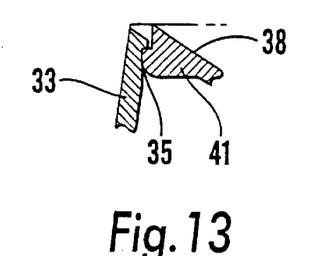
FIG. 13 is a detail of FIG. 12.

The upper face 31 is formed from eight triangular segments 38, each triangular segments corresponding to a wall segment 33. Each triangular segment 38 is hinged to two adjoining triangular segments, the segments forming a ring with a central aperture 39 wherein a slot 40 extends radially into each join between adjoining segments 38. At the periphery of the underside of the upper face 31, each triangular segment has a protrusion 41 for being received by the corresponding recess 35 in each wall segment 33 of the side wall unit 32.

To construct the container 30, the hinged wall segments 33 of the side wall unit 32 are positioned to form an octagonal base and the hinged triangular segments are positioned so that the upper face 31 forms a shape similar to a cone. The upper face 31 is placed inside the side wall unit 32 and the protrusions 41 engage the corresponding recesses 35 in the wall segments 33 to form the container. Screws 47 are inserted into holes in the top portion of the wall segments 33 and are screwed into the protrusions 41 of the triangular segments 38 of the upper face 31 so that the upper face 31 is fixed to and supported by the side wall unit 32.

Figure 14:
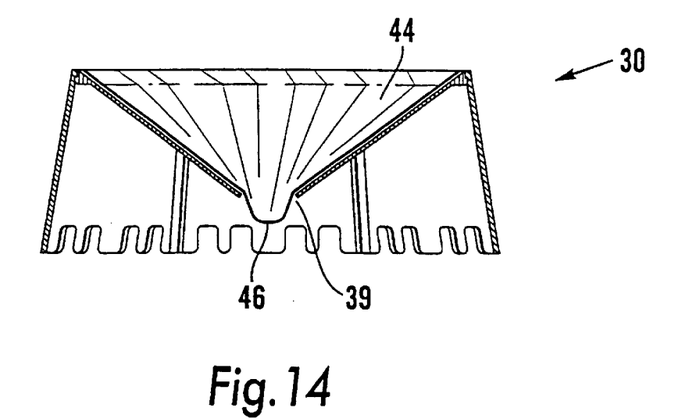
FIG. 14 is similar to FIG. 12 and shows a stack of sheets on the container.
Figure 15:
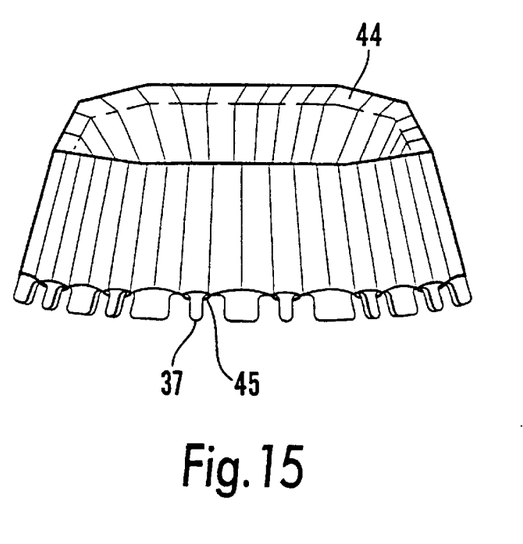
FIG. 15 is a perspective view of FIG. 14.

In a similar way to the first embodiment, a means for retaining covering material is formed from the plurality of slots 40 forming a plurality of downward-pointing, resilient, flexible fingers 42 around the aperture 39. A protective sheet is placed permanently on the container 30 and a stack of covering sheets 44 is placed above the protective sheet. In this embodiment, the stack 44 of covering sheets are similar to the stack 15 of covering sheets of the first embodiment except that each sheet has sixteen holes 45. Also, the protective sheet is of the same shape as the individual covering sheets of the stack 44 but is thicker than an individual covering sheet of the stack. The holes in the periphery of the protective sheet and the covering sheets of the stack are placed over the respective tongues 37 and a central portion 46 of the protective sheet and stack are pushed into the aperture 39. Thus, the protective sheet and the stack above are held by the container 30 as illustrated in FIGS. 14 and 15.

The uppermost covering sheet is removed from the container 30 by pulling it off to expose a fresh covering sheet (or the protective sheet if it is the last remaining sheet of the stack), the central aperture 39 retaining the remaining covering sheets of the stack, the covering sheet tearing from the circumference of the holes 45 when that sheet is pulled off. However, the material of the covering sheets is sufficiently strong so as not to generally tear when, for example, a pet is eating its food out of the covered container.

A container 30 is thus provided which is suitable for use as a pet food bowl and can be kept clean by a disposable sheet. The sheet can be quickly and easily removed when it has been soiled and the soiled portion can be easily disposed of with the minimum of fuss.

The container 30 may be sold as a kit of parts comprising the side wall unit 32 and the upper face 31. The side wall unit can be folded by means of the hinged connections/grooves between adjacent wall segments 33 so that the side wall unit is substantially flat. The upper face 31 of the kit can also be folded by means of the hinged connection between the triangular segments 38 so that the upper face is substantially flat. Thus, this container, as a kit of parts, can be flat-packed for easy storage and requires less storage room than an otherwise similar single piece container.

Figure 16:
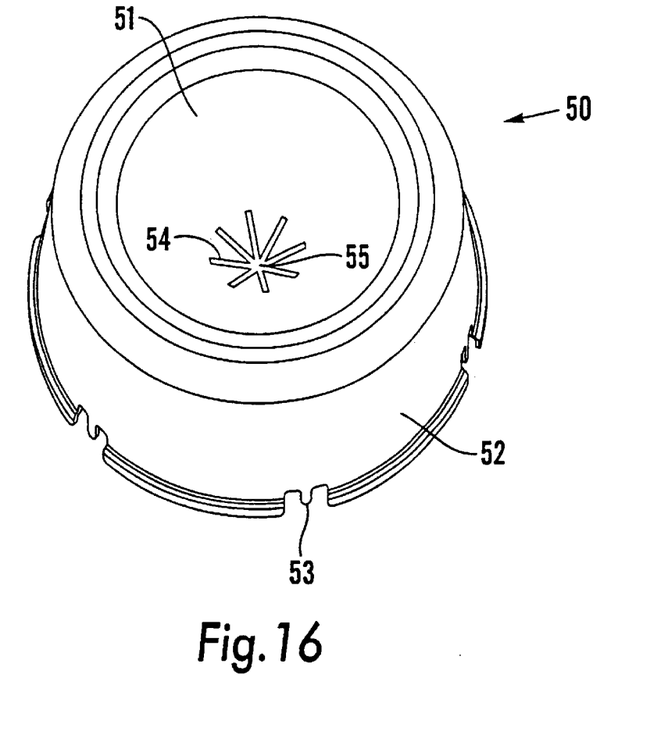
FIG. 16 is a perspective view of a container suitable for use as a pet food bowl in accordance with a third embodiment of the invention.
Figure 17:
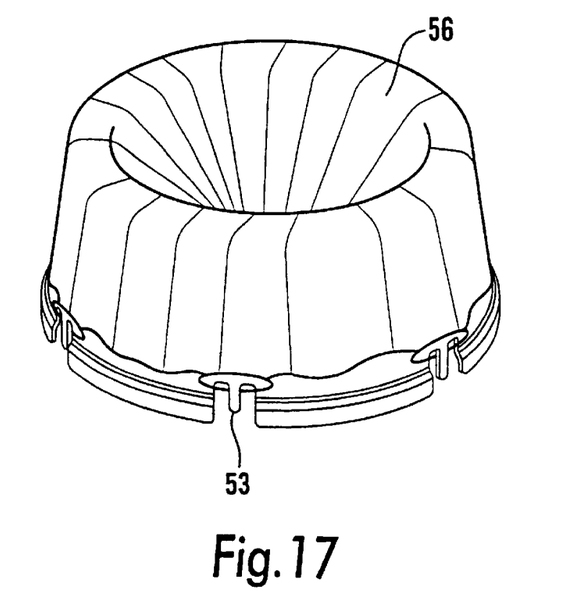
FIG. 17 is a perspective view of the container of FIG. 16 including a stack of sheets on it.

In a third embodiment, a single piece container 50 suitable for use as a pet food bowl is shown in FIGS. 16 and 17. The container is similar to the potty 1 in that it comprises a cone- or funnel-shaped upper face 51 and an annular side wall 52, the side wall having tongues 53 in recesses in its base and the lower region of the upper face having a means for retaining covering material, the means having a plurality of slots 54 extending radially from a central aperture 55.

In a similar way to the first and second embodiments, a protective sheet is placed permanently on the container 50 and a stack of covering sheets 56 is placed above the protective sheet, the holes 57 in the periphery of the protective sheet and the covering sheets of the stack being placed over the respective tongues 53 and the central portion of the protective sheet and stack being pushed into the aperture 55.

In the above-mentioned embodiments, the side wall 3,52 or side wall unit 32 and the upper face 2,31,51 are preferably made of a plastics material such as polypropylene.

In another embodiment, the upper face is formed from an upper part and a lower part. The upper part is a frusto-cone and may be formed from a substantially wide, incomplete circular band or ring, and the lower part is cone-shaped and fits inside the formed upper part. The lower part contains the central aperture and the flexible fingers for retaining the protective sheet and the stack of covering sheets. The lower part is preferably made from a nylon or the like to provide the flexibility for the fingers.

The term "cone- or funnel-shaped" is intended to include any suitably shaped upper face which slopes inwardly and downwardly to an aperture formed therein and any other suitable retaining means, preferably arranged generally centrally in the upper face. Thus, in the above-described embodiments, the cross-section of the upper face forms a generally flattened V-shape with straight slopes down to the aperture.

The container could be used for other purposes, apart from potty or a pet food bowl, in which a disposable cover would be advantageous. For instance, it could be used in applications where hygiene is important, such as for medical purposes in hospitals, clinics, etc.

Whilst particular embodiments has been described above it will be understood that various modifications may be made without departing from the scope of the invention. For example, the parts of the container and/or the sheets could be made from any alternative suitable materials.

The number of tongues can be varied and there may be less tongues on a container than holes on a sheet. The tongues with associated recesses may be replaced by stubs or the like protruding from the side wall wherein each stub is covered by a removable cap. Each cap may be attached to the container by a flexible hinge member, the cap and member being arranged to snap fit together in a conventional manner and can be pulled apart. Furthermore, the caps may be separate from the container as opposed to being an integral part of the container.

Instead of an aperture in the upper face of the container, alternative means for anchoring a part of the stack of sheets in the lower region of the upper face may be provided.

The covering sheets of the stack may be held together by deformities around the periphery of the holes caused by the punching of the holes during manufacture. Any number of sheets may be provided in the stack, as long as the stack is not too thick to be retained in the central aperture of the upper face. Each sheet may be covered with an anti-static spray which allows adjacent sheets of the stack to be separated more easily. The number of holes in the sheets and the sheet thickness are not limited to the numbers/thickness given in the described embodiments. The holes may be replaced by recesses that sufficiently engage the tongues to hold the stack in place. The recesses mean that the sheet material is not torn when a covering sheet is discarded. Each covering sheet may be provided with a tab to aid pulling the covering sheet off the stack.

The container may not necessarily have a protective sheet.

For the first embodiment, the protective sheet and the individual covering sheets of a stack may be shaped, for example, by deformation of their plastics material so as to fit over the raised parts of the upper periphery of the potty.

As opposed to the cross-section of the upper face forming a generally flattened V-shape with straight slopes down to the aperture, the V-shape may be flared out so that the slope down to the aperture is convex. Furthermore, the periphery of the upper face may not be limited to being circular or octagonal. The stack of sheets may be shaped to suit and there may be any suitable number of side walls.

Also, instead of the cone-shaped upper face, the interior of the container may have one or more substantially vertical sides and a substantially flat base, with means for retaining covering material being located in a central region of the base. A central portion of the stack would be held by the retaining means with tongues or stubs or the like holding the covering sheets to the side wall. The covering sheets may not necessarily be held taut. Such a container may be used for example as a rubbish bin. As rubbish is put into the bin the stack sags into the gap between the stack and the inside of the side wall. A protective sheet may also be included.

Where the container is formed from a kit of parts, the side wall or side walls may be assembled from a plurality of side wall units which are connected to one another.

Where the upper face comprises an upper part and a lower part, which both may form part of a kit of parts, the base of the lower part may be supported by a cylinder inside the side wall or walls.

The base of the container may have feet on which the container stands, and these may be of rubber.

What is claimed is:

1. A container comprising:
   at least one side wall having an outer surface;
   an interior formed within said at least one side wall and having a bottom; and
   means for releasably retaining a stack of flexible covering members, said retaining means being formed on or by said at least one side wall and also including a single aperture formed centrally in said bottom of said interior, whereby in use the stack is capable of being anchored in said single aperture and to the outer surface of said at least one side wall so as to cover the interior and at least part of the outer surface of said at least one side wall and enable the covering members to be sequentially removed from said stack.

2. A container as claimed in claim 1, wherein the retaining means formed in the lower region of the interior comprises a plurality of slots extending substantially radially from the aperture so as to provide a plurality of downwardly-pointing, resilient fingers which inhibit upward pulling of the stack which is retained by the aperture.

3. A container as claimed in claim 1, wherein the means for releasably retaining the stack includes a plurality of engaging members on the side wall or walls of the container, each engaging member being adapted to engage a recess or a hole in the stack.

4. A container as claimed in claim 1, including a flexible sheet-like protective member which covers at least the lower region of the interior for protecting the stack from being damaged by the retaining means formed in the lower region of the interior.

5. A container as claimed in claim 4, wherein the protective member is retained by said retaining means.

6. A container as claimed in claim 1, wherein the interior of the container comprises a generally cone-shaped upper face supported by said side wall or walls.

7. A container as claimed in claim 6, comprising a kit of parts having at least one side wall unit and an upper face which fit together.

8. A container as claimed in claim 7, wherein the or each side wall unit comprises a plurality of interconnecting wall segments.

9. A container as claimed in claim 1, including a removable ring which is adapted to be placed over the container so as to aid in retaining the stack on the container.

10. A stack of disposable, flexible, plastic and sheet-like covering members held together by a deformed portion of each of said covering members,
    said stack being arranged to cover a container, said container comprising at least one side wall having an outer surface, an interior formed within said at least one wall and having a bottom, and means for releasably retaining said stack, said retaining means being formed on or by said at least one side wall and also including a single aperture formed centrally in said bottom of said interior,
    whereby in use the stack is anchored in said single aperture and to the outer surface of said at least one side wall, and the interior of said container and at least part of the outer surface of said at least one side wall remains covered by said stack upon sequential removal therefrom of said covering members until all of said covering members have been removed.

11. A stack of disposable, flexible, plastic and sheet-like covering members each having an outer periphery which has been melted at spaced intervals therearound so as to releasably hold all of said covering members together in said stack,
    said stack being arranged to cover a container comprising at least one side wall having an outer surface, an interior formed within said at least one wall and having a bottom, and means for releasably retaining said stack, said retaining means being formed on or by said at least one side wall and also including a single aperture formed centrally in said bottom of said interior,
    whereby in use the stack is anchored in said single aperture and to the outer surface of said at least one side wall, so as to cover the interior of said container and at least part of the outer surface of said at least one side wall and enable sequential removal of said covering members from said stack until all of said covering members have been removed.

12. A stack of disposable, flexible, plastic and sheet-like covering members having a plurality of holes formed by punching through said stack, said punching forming deformities of said covering members around said holes which releasably hold together all of said covering members in said stack, said stack being arranged to cover a container comprising at least one side wall having an outer surface, an interior formed within said at least one wall and having a bottom, means for releasably retaining said stack, said retaining means being formed on or by said at least one side wall and also including a single aperture formed centrally in said bottom of said interior, whereby in use the stack is anchored in said single aperture and to the outer surface of said at least one side wall, so as to cover the interior of said container and at least part of the outer surface of said at least one side wall and enable sequential removal of said covering members from said stack until all of said covering members have been removed.

* * * * *